(12) United States Patent
Cholewin et al.

(10) Patent No.: US 8,462,126 B2
(45) Date of Patent: *Jun. 11, 2013

(54) METHOD FOR IMPLEMENTING ZOOM FUNCTIONALITY ON A PORTABLE DEVICE WITH OPPOSING TOUCH SENSITIVE SURFACES

(75) Inventors: Erik A. Cholewin, Libertyville, IL (US); John J. Gorsica, Round Lake, IL (US); Michael J. Lombardi, Lake Zurich, IL (US); Natalie J. Prochnow, Spring Grove, IL (US); Ian M. Snyder, Vernon Hills, IL (US)

(73) Assignee: Motorola Mobility LLC, Libertyville, IL (US)

( * ) Notice: Subject to any disclaimer, the term of this patent is extended or adjusted under 35 U.S.C. 154(b) by 459 days.

This patent is subject to a terminal disclaimer.

(21) Appl. No.: 12/505,775

(22) Filed: Jul. 20, 2009

(65) Prior Publication Data

US 2011/0012928 A1 Jan. 20, 2011

(51) Int. Cl.
G06F 3/041 (2006.01)

(52) U.S. Cl.
USPC ......... 345/173; 345/156; 345/157; 178/18.06

(58) Field of Classification Search
USPC ................ 345/156–174; 178/18.06
See application file for complete search history.

(56) References Cited

U.S. PATENT DOCUMENTS

| | | | |
|---|---|---|---|
| 4,076,262 A | 2/1978 | Deventer | |
| 5,128,671 A | 7/1992 | Thomas, Jr. | |
| 5,494,447 A | 2/1996 | Zaidan | |
| 5,543,588 A | 8/1996 | Bisset et al. | |
| 5,610,971 A | 3/1997 | Vandivier | |
| 5,729,219 A | 3/1998 | Armstrong et al. | |
| 5,896,575 A | 4/1999 | Higginbotham et al. | |
| 5,898,600 A | 4/1999 | Isashi | |
| 5,959,260 A | 9/1999 | Hoghooghi et al. | |
| 6,020,878 A | 2/2000 | Robinson | |
| 6,201,554 B1 | 3/2001 | Lands | |

(Continued)

FOREIGN PATENT DOCUMENTS

| | | |
|---|---|---|
| EP | 0 913 977 A2 | 5/1999 |
| EP | 1335567 A1 | 2/2002 |

(Continued)

OTHER PUBLICATIONS

Microsoft's Lucid Touch transparent, multi-touch mobile device, LucidTouch photo; www.dancewithshadows.com/tech/lucid-touch.asp; Mar. 10, 2008, 2 pages.

(Continued)

Primary Examiner — Amare Mengistu
Assistant Examiner — Premal Patel

(57) ABSTRACT

An improved mobile electronic device 100 with a unique thin and cost-effective form and design can have a large display 170 in the outward surface of a flip 102, a large full qwerty keypad 138 in the outward surface of a base 108, and a touchpad 186 in the inward surface of the flip. This arrangement provides useful zooming functionality and magnification techniques, as well as the ability to navigate the display using the touchpad while assuring that the full view of the display is not blocked. This arrangement also accommodates changing the mode of the touchpad from a navigation mode to a zoom mode and vice versa.

20 Claims, 5 Drawing Sheets

U.S. PATENT DOCUMENTS

| | | | |
|---|---|---|---|
| 6,233,138 | B1 | 5/2001 | Osgood |
| 6,392,870 | B1 | 5/2002 | Miller, Jr. |
| 6,457,547 | B2 | 10/2002 | Novitschitsch |
| 6,466,198 | B1 | 10/2002 | Feinstein |
| 6,532,147 | B1 | 3/2003 | Christ, Jr. |
| 6,549,789 | B1 | 4/2003 | Kfoury |
| 6,597,347 | B1 | 7/2003 | Yasutake |
| 6,927,747 | B2 | 8/2005 | Amirzadeh et al. |
| 7,058,433 | B2 | 6/2006 | Carpenter |
| 7,075,513 | B2 | 7/2006 | Silfverberg et al. |
| 7,205,959 | B2 | 4/2007 | Henriksson |
| 7,218,313 | B2 | 5/2007 | Marcus et al. |
| 2001/0052122 | A1 | 12/2001 | Nanos et al. |
| 2003/0103324 | A1 | 6/2003 | Gallivan |
| 2003/0199290 | A1 | 10/2003 | Viertola |
| 2003/0234768 | A1 | 12/2003 | Rekimoto et al. |
| 2005/0012723 | A1 | 1/2005 | Pallakoff |
| 2005/0020325 | A1 | 1/2005 | Enger et al. |
| 2005/0024339 | A1 | 2/2005 | Yamazaki et al. |
| 2005/0031390 | A1 | 2/2005 | Orozco-Abundis |
| 2005/0096106 | A1 | 5/2005 | Benetts et al. |
| 2005/0124395 | A1 | 6/2005 | Bae et al. |
| 2005/0282596 | A1 | 12/2005 | Park et al. |
| 2006/0017711 | A1* | 1/2006 | Pihlaja .......................... 345/173 |
| 2006/0024601 | A1 | 2/2006 | Ogawa et al. |
| 2006/0034601 | A1 | 2/2006 | Andersson et al. |
| 2006/0037175 | A1 | 2/2006 | Hyun |
| 2006/0084482 | A1 | 4/2006 | Saila |
| 2006/0092355 | A1 | 5/2006 | Yang et al. |
| 2006/0111160 | A1 | 5/2006 | Lin et al. |
| 2006/0197750 | A1 | 9/2006 | Kerr et al. |
| 2006/0284853 | A1 | 12/2006 | Shaprio |
| 2007/0075915 | A1 | 4/2007 | Cheon et al. |
| 2007/0076861 | A1 | 4/2007 | Ju |
| 2007/0097151 | A1* | 5/2007 | Rosenberg .................... 345/660 |
| 2007/0103454 | A1 | 5/2007 | Elias |
| 2007/0127199 | A1 | 6/2007 | Arneson |
| 2007/0177803 | A1 | 8/2007 | Elias et al. |
| 2008/0004085 | A1 | 1/2008 | Jung et al. |
| 2008/0102888 | A1 | 5/2008 | Sellgren et al. |
| 2008/0192977 | A1 | 8/2008 | Gruenhagen et al. |
| 2008/0211783 | A1 | 9/2008 | Hotelling et al. |
| 2008/0261661 | A1 | 10/2008 | Jessop |
| 2009/0046110 | A1 | 2/2009 | Sadler et al. |
| 2009/0061948 | A1 | 3/2009 | Lee et al. |
| 2009/0066660 | A1 | 3/2009 | Ure |
| 2009/0096749 | A1 | 4/2009 | Kawahara et al. |
| 2009/0131117 | A1* | 5/2009 | Choi ............................. 455/566 |
| 2009/0140863 | A1 | 6/2009 | Liu et al. |
| 2009/0201253 | A1 | 8/2009 | Jason et al. |
| 2009/0241048 | A1* | 9/2009 | Augustine et al. ............ 715/769 |
| 2009/0298547 | A1 | 12/2009 | Kim et al. |
| 2009/0315834 | A1 | 12/2009 | Nurmi et al. |
| 2010/0007603 | A1 | 1/2010 | Kirkup |
| 2010/0113100 | A1 | 5/2010 | Harmon et al. |
| 2010/0134409 | A1 | 6/2010 | Challener et al. |
| 2011/0012921 | A1 | 1/2011 | Cholewin et al. |
| 2011/0157799 | A1 | 6/2011 | Harmon et al. |

FOREIGN PATENT DOCUMENTS

| | | |
|---|---|---|
| EP | 1408400 A2 | 4/2004 |
| EP | 2065786 A1 | 6/2009 |
| FR | 2771769 A1 | 6/1999 |
| GB | 2339505 A1 | 1/2000 |
| GB | 2368483 A | 5/2002 |
| KR | 100683535 B1 | 2/2007 |
| KR | 1020070035026 A | 3/2007 |
| WO | 2005071928 A1 | 8/2005 |
| WO | 2005111769 A2 | 11/2005 |
| WO | 2008030563 A2 | 3/2008 |
| WO | 2009123406 A2 | 10/2009 |

OTHER PUBLICATIONS

Patent Cooperation Treaty, "PCT Search Report and Written Opinion of the International Searching Authority" for International Application No. PCT/US2010/031879 Jul. 7, 2010, 14 pages.

Erh-Li (Early) Shen et al., "Double-side Multi-touch Input for Mobile Devices", CHI 2009—Spotlight on Works in Progress, Apr. 4-9, 2009, pp. 4339-4344, Boston, MA, USA.

Daniel Wigdor et al., "Lucid Touch: A See-through Mobile Device" Proceedings of the 20th Annual ACM Symposium on User Interface Software and Technology, Oct. 7-10, 2007, pp. 268-278, XP002582051.

Patent Cooperation Treaty, "PCT Invitation to Pay Additional Fees and, Where Applicable, Protest Fee and Communication Relating to the Results of the Partial International Serach" for International Application No. PCT/US2010/037568, International Filing Date Jun. 7, 2010 (mailed Sep. 23, 2010).

Michael L. Charlier, et al., U.S. Appl. No. 12/433,253 for a Hand Held Electronic Device and Method of Performing a Dual Sided Gesture, filed Apr. 30, 2001.

John J. Gorsica, et al., U.S. Appl. No. 12/492,369 for an Implementation of Touchpad on Rear Suface of Single-Axis Hinged Device, filed Jun. 29, 2009.

Patent Cooperation Treaty, "PCT International Search Report and Written Opinion of the International Search Authority" for International Application No. PCT/US2010/040876, International Filing Date Jul. 2, 2010 (mailed Oct. 6, 2010).

International Application No. PCT/FI2004/000381, filed Jun. 23, 2004, International Publication No. WO 2004/114636 A1, published Dec. 29, 2004, of Nokia Corporation, of inventors Mantysalo et al., pertains to a Multifunctional UI Input Device for Mobile Terminals.

Publication: Gerry Chu et al., "Lucid Touch prototype" published by lucid touch microsoft research & mitsubishi electric research labs, Nov. 26, 2008.

Publication: Illustration of GPS system, published by lucid touch microsoft research & mitsubishi electric research labs, Nov. 26, 2008.

United States Patent and Trademark Office, "Non-Final Office Action" for U.S. Appl. No. 12/433,253 dated Feb. 16, 2012, 22 pages.

United States Patent and Trademark Office, "Non-Final Office Action" for U.S. Appl. No. 12/565,200 dated Sep. 18, 2012, 22 pages.

Masanori Sugimoto and Keiichi Hiroki, HybridTouch: An Intuitive Manipulation Technique for PDAs Using Their Front and Rear Surfaces, 2006, Proceeding MobileHCI '06 Proceedings of the 8th conference on Human-computer interaction with mobile devices and services, pp. 137-140.

Product information for Adesso Easy Cat 2 Button Glidepoint Touchpad (Black), downloaded on Sep. 12, 2012 from Adesso.com website, http://www.adesso.com/en/componentlcontentlarticle/63-touchpads/189-gp-160.html, 2 pages.

United States Patent and Trademark Office, "Non-Final Office Action" for U.S. Appl. No. 12/565,200 dated Jan. 16, 2013, 12 pages.

* cited by examiner

METHOD FOR IMPLEMENTING ZOOM FUNCTIONALITY ON A PORTABLE DEVICE WITH OPPOSING TOUCH SENSITIVE SURFACES

BACKGROUND OF THE INVENTION

1. Field of the Disclosure

The disclosure relates in general to mobile devices, and more particularly, to mobile electronic devices with an electronic display and a keypad. In certain embodiments, the mobile electronic device comprises a mobile telephone, but the disclosure is not limited to mobile telephones.

2. Background Art

There is a significant market for mobile electronic devices with large displays coupled with large, full qwerty keypads, as well as, a unique, thin, and cost-effective mobile electronic device with a keypad on the back of a clamshell device and a single display on the front of the device.

Conventional zoom and magnification techniques to enlarge or decrease the size of text or graphics on a display screen of a mobile electronic device often require touching, tapping, clicking and partially blocking the touchscreen display.

It is desirable to have new interactions with a touchpad on the rear surface of a hinged or slide device behind the touchscreen display of a mobile electronic device with a new form to improve the user experience on the mobile electronic device.

SUMMARY OF THE INVENTION

An improved mobile electronic device with a unique thin and cost-effective form and design is provided that is user-friendly, reliable, fun and effective. The attractive mobile electronic device can have a large display on the outward surface of a flip or slide, a large full qwerty keypad on the inward or outward surface of a base and can have a capacitive touchpad on the inward surface of the flip or slide. The multi-functional mobile electronic device is easy to use, comfortable and economical.

The mobile electronic device can be a radiotelephone, a cellular (cell) phone, a mobile phone, smart phone, flip phone, slider phone, portable networking device, qwerty flip device, wireless device, portable gaming device, mobile communications device, personal digital assistant (PDA), wireless e-mail device, a two way pager, internet communication device, hand held electronic device, or combinations of the preceding. Desirably, the mobile electronic device is of a compact size for readily fitting in a shirt pocket, pants pocket, suit pocket, and/or purse.

The user-friendly mobile electronic device provides new interactions with a touchpad on the rear surface of a hinged or slide device behind the touchscreen display to improve the user experience on the mobile electronic device.

By adding a touchpad behind the main touchscreen display, multiple useful magnification techniques become viable, such as but not limited to those described hereinafter.

The touchpad can act as a linear zoom-in/zoom-out sliding bar in a browser window which eliminates the need to block the display touchscreen while zooming. The display touchscreen can then be used to navigate the page. Advantageously, the user does not have to block the screen to zoom in and/or zoom out.

A user can point and hold the user's finger on the touchscreen display, then slide their finger on the rear touchpad to zoom in or out at a point that was selected on the front touchscreen display. This can allows the user to zoom to a specific point on the touchscreen display.

Pressing a shift key or command button on the mobile electronic device can change the behavior of the touchpad from an X/Y navigation device to a zoom control. More specifically, the rear touchpad can be used as an X/Y navigation device, but when a touchpad is applied and held, the function is changed to a zoom-in/and zoom-out control until the press key or button is released at which point functionally returns to that of an X/Y navigation device. This allows the touchpad to serve multiple purposes including navigation and zoom in and out functionality. Furthermore, it also keeps the user from having to block and smudge the display.

Desirably, the novel mobile electronic device does not require blocking the main touchscreen display to accomplish the desired magnification and zoom to enlarge or decrease the size of text or graphics on the touchscreen display.

When multiple applications are running in the background, making contact with the touchpad and holding brings up a small window overlaid on the current display screen showing all running applications. The user can then navigate to the desired application and can select the highlighted application. Advantageously, the user does not have to exit from the current display screen in order to get to another area of the user interface (UI).

When in a UI with tabbed windows, the user can be scrolling left or right on the touchpad to select different tabs while scrolling on the touchscreen display interacts with the page. This allows the tabs to be smaller in size and increase the amount of viewable page since the tabs do not have to be touched with a finger.

In a media player scenario, the user can use the touchpad to cycle through album titles or art using the touchscreen to select tracks. Albums do not have to appear large enough to touch on the touchscreen. This arrangement can allow more information to be displayed on the page at one time.

The inventive mobile electronic display provides an improved method of interaction with onscreen information. It reduces the number of specific actions to complete a task and makes them easier to complete. It can also eliminate the need for 100% touchable icons in a touchscreen device UI and can eliminate the need to block the touchscreen display while interacting.

The mobile electronic device can have a flip that is operatively connected to a base and is movable from an open position to a closed position and vice versa. The mobile electronic device can have: a keypad on the outward surface of the base; a display assembly comprising a user interface and a display, preferably a touchscreen display on the outward surface of the flip; and a touchpad comprising a navigation control on the inward surface of the flip for navigating the display. The touchpad is preferably positioned for use without blocking view of the display.

The touchpad can include: a zoom control for zooming, increasing or decreasing the size of text or other graphics on the display, a magnifier for magnifying a portion of the display, and/or a sliding bar in a browser window for zooming a portion of the display. The touchpad can also comprise a zoomable touchpad for zooming in and out of an area of the display touched by the user in response to touching the touchpad.

In another embodiment, the touchpad comprises a visual selector for viewing or cycling through media, such as songs, albums, art, movies, videos, photographs, books, newspapers, magazines, and titles of the preceding. The touchscreen display can comprise a tracking device for selecting the media or a track or location of the media.

The invention also provides an improved method for using a mobile electronic device for implementing zoom functionality on the mobile electronic device, as well as an improved method for navigating layered data using two opposing touch surfaces. The method includes providing a mobile electronic device comprising a flip pivotably connected to a base, a keypad on an outward surface of the base, a display, preferably a touchscreen display, on an outward surface of the flip, and a touchpad on an inward surface of the flip. The method further comprises navigating the touchscreen display by sliding a finger along or touching the touchpad, while simultaneously allowing full view of the display and preventing blocking of the view of the touchscreen display.

The novel method can include: zooming in and out of a portion of the touchscreen display by touching, contacting, or engaging the touchpad and/or magnifying a portion of the touchscreen display by pressing, tapping or clicking the touchpad. The method can further include changing or transforming the mode of the touchpad from a navigation mode to a zoom mode and vice versa. Also, the method can include scrolling the touchpad and/or touchscreen display.

This invention as described in the specification and patent claims achieves excellent performance.

A more detailed explanation of the invention is provided in the following detailed descriptions and appended claims taken in conjunction with the accompanying drawings.

DETAILED DESCRIPTION OF THE INVENTION

Figure 1:
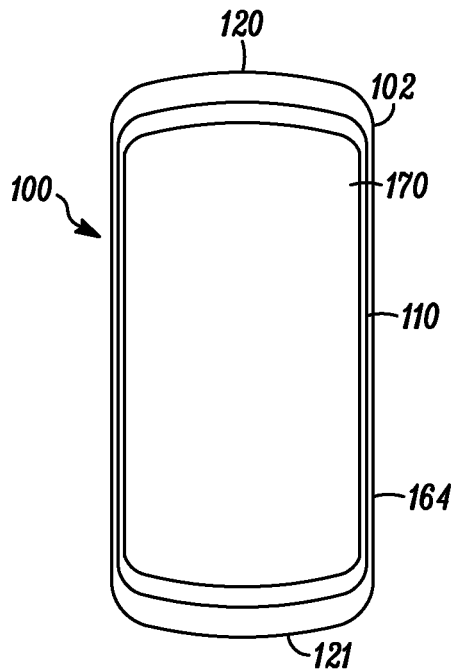
FIG. 1 is a front view of a mobile electronic device in accordance with principle of the present invention of the present disclosure shown in a closed position in a tablet mode in which the flip and base are positioned at a zero (0) degree angle relative to each other.

The following is a detailed description and explanation of the preferred embodiments of the invention and best modes for practicing the invention.

Referring to the drawings, a mobile electronic device 100 can comprise a flip 102 which can be pivotally connected by a hinge 104 to a base 106. The flip can be pivotable from a closed position, to partially open positions and to a fully open position and vise versa. The mobile electronic device can be movable to different orientations for providing different functionality in the partially open positions.

The mobile electronic device can be: a flip phone, slider phone, portable networking device, internet communications device, clamshell device, radio telephone, cellular phone, mobile phone, smart phone, portable gaming device, personal digital assistant, wireless e-mail device, two-way pager, handheld electronic device, or combinations of the preceding.

The mobile electronic device preferably is of a compact size for readily fitting in a shirt pocket, pants pocket, suit pocket, and/or purse.

The base and the flip each can have an outward (outer) surface 108 or 110, an inward (inner) surface 112 or 114, edges comprising longitudinal sides 115, 116, 117 or 118 in a portrait mode, and lateral ends 119, 120, 121 or 122 in a portrait mode.

The base can have a transceiver housing 123 (xcvr) and defines an internal base compartment that can provide a cavity for containing a battery and a speaker. The base can have a keypad assembly 132 which can comprise a housing with a rim that can provide a periphery that can surround or partially surround a keypad 138. The keypad assembly can have backlighting below the keypad. The keypad can be positioned on the outward surface of the base and can face downwardly when the flip is in the partially open position, such as in a media viewing mode. The keypad can be partially transparent, clear and light transmissive. The keypad can comprise: a qwerty keypad, capacitive keypad, keyboard, alpha numeric keys, a base touchscreen, or combinations of the preceding. The keypad can have a capacitive touch surface. The keypad can occupy most, preferably 70% to 99% of the outward surface of the base.

The keypad can also comprise a moldprint keypad with graphics on an underside of the keypad or on a layer below the keypad. Such graphics for the keypad can include one or more of the following: text, numbers, characters, alpha numeric images, color graphics, black graphics, moving graphics, animation, video clips, logos, photographs, decorations, designs, symbols, and other images.

The keypad can comprise a recessed keypad positioned below the maximum elevation or height of the rim which provides the top of the housing so that when the keypad assembly is placed on a support surface, such as a table, desk, or shelf, the rim engages the surface, but the recessed keypad is spaced above the support surface and prevented from touching or otherwise engaging the support surface.

The keypad can include a flash, such as a light-emitting diode (LED) or other illumination source, in proximity to an imager, such as a camera, webcam, camera lens, zoom lens, webcam, or other image capture device. The keypad assembly can include a light barrier, such a light-blocking gasket or ribs, for substantially preventing the flash from illuminating graphics on the keypad and for substantially minimizing hot spots in images captured by the imager.

In one embodiment, the keypad comprises a tactile qwerty keypad positioned over a series of switches which a user can depress.

A display structure assembly 164 can provide a display module with display housing and a touchscreen display 170 on the outward surface of the flip. The display can be positioned opposite the keypad when the flip is in a closed position in a tablet mode. The display can face upwardly with and in proximity to the keypad when the flip in a fully open position in an e-mail/text mod. The display can be positioned at an angle of inclination when the flip is in a partially open position in a media viewing mode. The display can occupy most, preferably 70% to 99% of the outward surface of the base.

The display can comprise a touchscreen comprising a touch sensitive lens with an input lens surface. Touch sensors can be integrated to either the input surface or the opposite surface of the lens. The touch sensor generates a signal in response to a manually engageable haptic input from a user when the user touches the lens with a finger to emit light forming an image on the lens. The touchscreen display can be can be a transparent, clear and light transmissive and can comprise a capacitive touchscreen, an organic light emitting display (OLED) or a liquid crystal display (LCD). The touchscreen can electronically show and display graphics, such as, but not limited to, one or more of the following: text, numbers, characters, alpha numeric images, color graphics, black graphics, moving graphics, animation, video clips, logos, photographs, decorations, designs, symbols, and other images.

The display assembly can have a user interface (UI) which can provide haptics. The user interface of the display structure assembly can include the touchscreen display.

A touchpad assembly 186 can provide a touchpad sensor and a touchpad cover. The touchpad assembly can also have a housing (touchpad housing) and a bezel (touchpad bezel) which can provide a back plate (touchpad backplate), with or without a rim, for holding the touchpad, such as with adhesive. A touchpad gasket can be positioned between and sealing the touchpad housing to a peripheral portion of the touchpad.

The touchpad can be positioned on the inward surface of the flip at a location which is transversely opposite of the display. The touchpad can be a capacitive touchpad for detecting the position of the flip. The touchpad can provide navigation control within the user interface (UI) on the display, such as, but not limited to: highlighting a web link on the display, scrolling through text on the display, clicking to enter a command on the display, and/or implementing a mouse cursor on the touchscreen. The touchpad can also comprise one or more of the following: zoom control, a magnifier, scroll bar, scroll control, a slide bar in a browser window, enter key, command key, shift key, visual selector, cursor, and/or pointer. The touchpad can occupy a substantial portion, such as from 25% to 75%, of the inward surface of the flip. In the illustrative embodiment, the touchpad is smaller and occupies a smaller area than either the touchscreen display or the keypad.

Advantageously, the touchpad is positioned to be touched by the user without blocking viewing of the display when the flip is in the partially open and fully open positions. The touchpad can be hidden and inaccessible when the flip is in the closed position.

A removable battery door 194 can be positioned along the inward surface of the base at a location transversely opposite of the keypad. The removable battery door can be hidden and inaccessible when the flip is in the closed position.

A speaker port can be hidden underneath the removable battery door. The speaker port can provide an acoustical passageway for emitting sound from the speaker.

The flip can have an internal flip compartment that provides a cavity to contain a printed circuit board (PCB) in the flip. A pattern of capacitive touch traces or wires can be embedded within the printed circuit board for detecting a user's finger gestures without increasing the size of the mobile electronic device. Non-conductive decorative layers can be provided to bring the touch surface of the touchpad flush with the touchpad housing.

The mobile electronic device can have a base that provides and defines a compartment for containing a battery. A flip can be pivotably connected to the base with a hinge so that the flip is pivotable from a closed position, to a partially open position and to a fully open position and vise versa. A keypad can be positioned on the outward surface of the base and faces downwardly when the flip is in the partially open position. The mobile electronic device can also have a display assembly comprising a user interface with a touchscreen display on the outer surface of the flip. The display can be positioned opposite the keypad when the flip is in a closed position. The display can also face upwardly with and in proximity to the keypad when the flip is in a fully open position, and the display is positioned at an angle of inclination when the flip is in a partially open position.

The mobile electronic device can have a touchpad positioned on the inward surface of the flip and can be positioned transversely opposite of the display. The touchpad is preferably hidden and inaccessible when the flip is in the closed position. Advantageously, the touchpad comprises a navigation control on the inward surface of the flip for navigating the display. Desirably, the touchpad can be used by a user without blocking view of the display. The mobile electronic device can also have a battery door positioned along the inward surface of the base and positioned transversely opposite of the keypad. The battery door can be hidden and inaccessible when the flip is in the closed position.

The touchpad can include: a zoom control for zooming, increasing or decreasing the size of text or other graphics on the display, a magnifier for magnifying a portion of the display, and/or a sliding bar in a browser window for zooming a portion of the display. The touchpad can also comprise a zoomable touchpad for zooming in and out of an area of the display touched by the user in response to touching the touchpad.

The touchpad can further comprise a changeable touchpad for changing from the navigator in a navigation mode to a zoom control in a zoom mode in response to pressing a shift key or a command button on the mobile electronic device, changing the orientation of the mobile electronic device, launching an application, or touching the touchscreen or touchpad with a specific gesture and/or a transforming touchpad for transforming to a zoom control when the touchpad is touched and held by the user and returning to the navigator when the touchpad is released by the user.

The touchpad also comprise a capacitive touchpad for activating a window on the touchscreen display to display downloaded applications in the mobile electronic device when the user touches the capacitive touchpad or to electronically display applications which are downloaded, frequently used, idle, active, and available in the mobile electronic device when the user touches the capacitive touchpad; and the capacitive touchpad can be used by the user to scroll and select one or more of the applications.

The user interface can comprise tabled windows providing tabs and the touchpad can comprise a touchpad scroll control for scrolling in response to moving a finger of the user along the touchpad for selecting different tabs on the user interface. The display can electronically illustrate and display a page. The display can further comprise a display-scroll control for scrolling on the display to interact with the page while the touchpad is being scrolled to provide smaller tabs and increase the view of the page.

The touchpad can further comprise a visual selector for viewing or cycling through media, such as songs, albums, art, movies, videos, photographs, books, newspapers, magazines, and titles of the preceding.

The invention also provides an improved method for using a mobile electronic device for implementing zoom functionality on the mobile electronic device as well as an improved method for navigating layered data using two opposing touch surfaces. The method includes providing a mobile electronic device comprising a flip pivotably connected to a base, a keypad on an outward surface of the base, a display, preferably a touchscreen display, on an outward surface of the flip, and a touchpad on an inward surface of the flip. The method further comprises navigating the touchscreen display by sliding a finger along or touching the touchpad; while simultaneously allowing full view of the display and preventing blocking of the view of the touchscreen display.

The novel method can include: zooming in and out of a portion of the touchscreen display by touching, contacting, or engaging the touchpad and/or magnifying a portion of the touchscreen display by pressing, tapping or clicking the touchpad. The method can further include changing or transforming the mode of the touchpad from a navigation mode to a zoom mode and vice versa. Also, the method can include scrolling the touchpad and/or touchscreen display.

The hinge can comprise a friction hinge which can have a radial range of motion of 180 degrees or more and can have detents at both ends of travel. This can be achieved through the use of an asymmetrical cam in conjunction with a single tab on a follower. The friction hinge can allow a full 360 degree range of motion with any number of detents at any radial position. The friction hinge also provides a dependable and inexpensive way to produce a tilt in the display of a qwerty flip device or in a qwerty mode.

Figure 5:
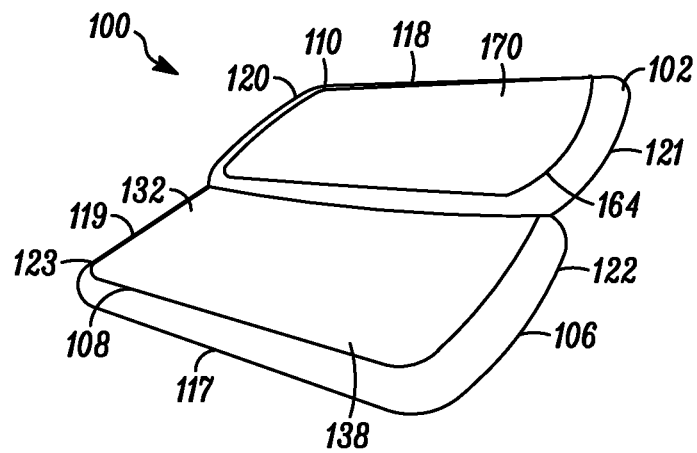
FIG. 5 is a perspective view of the mobile electronic device shown in a fully open position in a text-entry mode.
Figure 6:
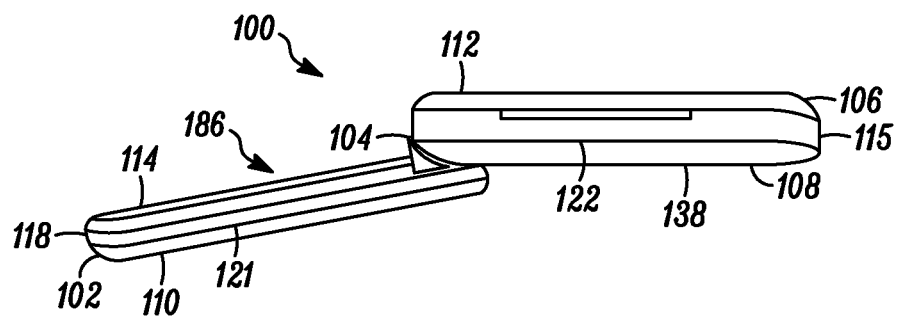
FIG. 6 is a side view of the mobile electronic device shown in the fully open position in the text-entry mode.
Figure 7:
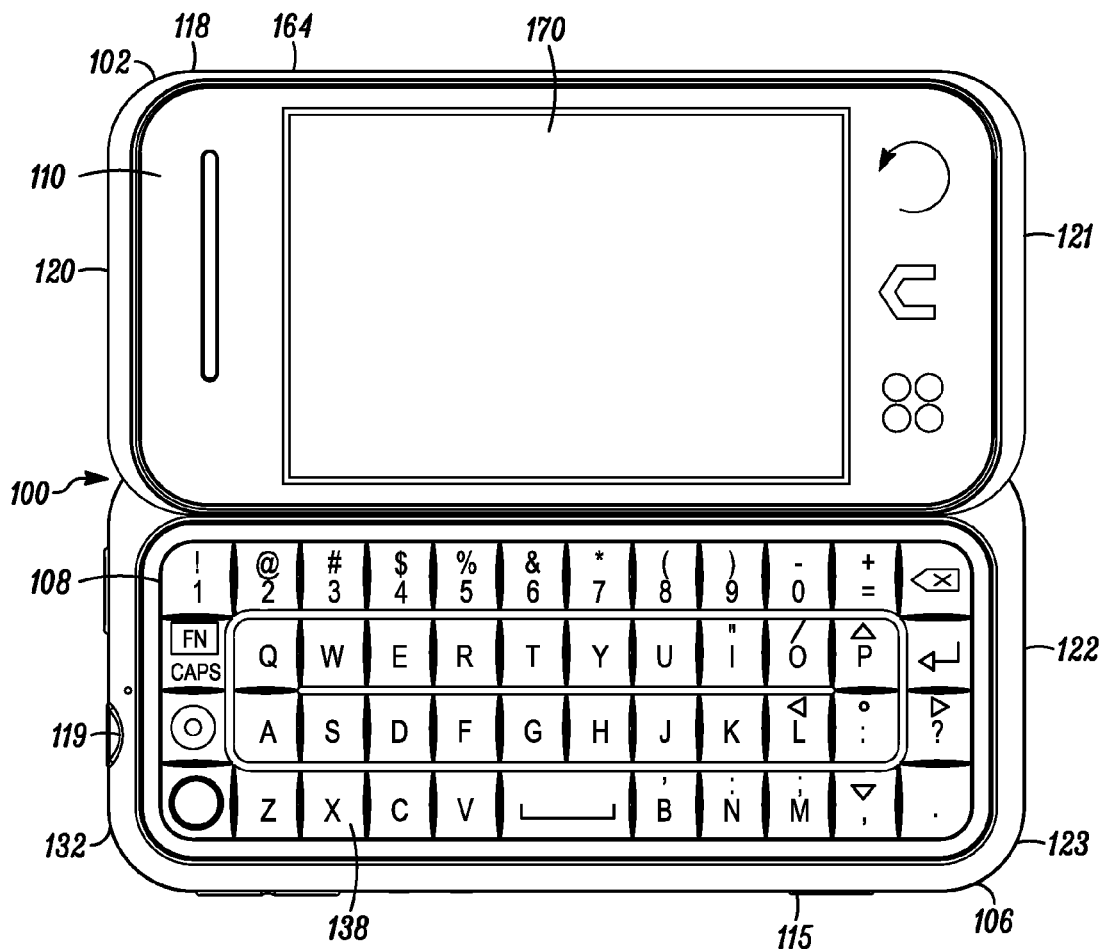
FIG. 7 is a front view of the mobile electronic device shown in the fully open position.
Figure 8:
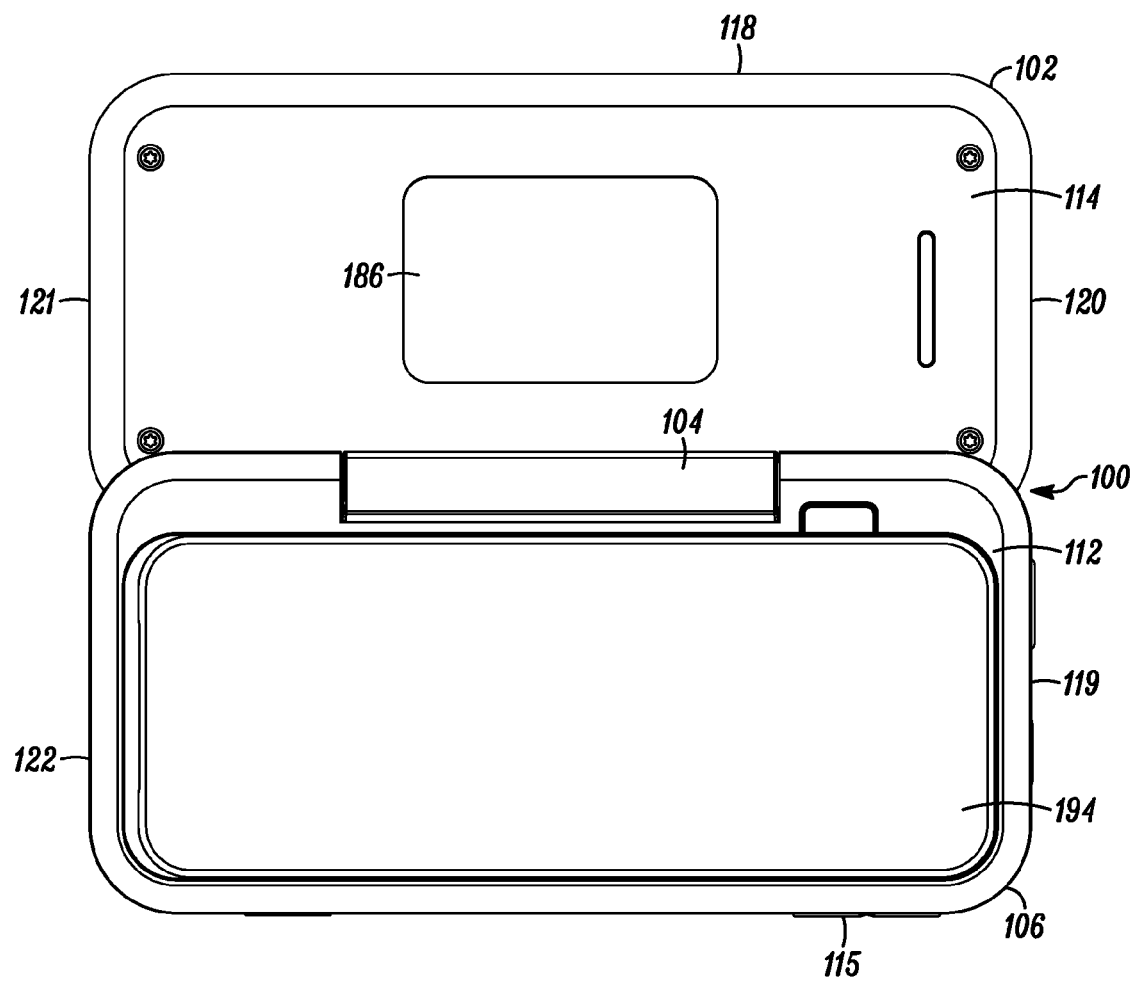
FIG. 8 is a back view of the mobile electronic device shown in the fully open position.

Advantageously, the friction hinge provides specific positions of the electronic device including: (1) a closed position in a tablet mode as shown in FIGS. 1 and 2 in which the flip and base are positioned at a zero (0) degree angle relative to each other at a closing torque, (2) a fully open position in a qwerty mode as shown in FIGS. 5 and 6 in which the flip and base are positioned at a open angle at or substantially greater than about 180 degrees at a fully open qwerty torque, and (3) a partially open position in a media viewing mode as shown in FIGS. 3 and 4 in which the flip and base are positioned at an open angle substantially greater than the closed position but substantially less than fully open position at a torque less than the closing torque and the fully open torque.

In the preferred embodiment, the partially open position in the media viewing mode ranges from 70 degrees to 100 degrees and the fully open position is 180 degrees to 190 degrees in the qwerty mode.

Figure 2:
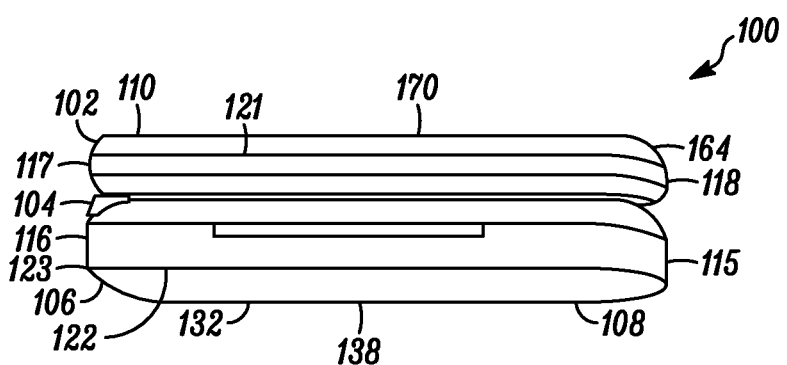
FIG. 2 is a side view of the mobile electronic device shown in the closed position in the tablet mode.

In operation and use, in the tablet mode of FIGS. 1 and 2, the flip is held closed using the first detent in the cam. In the closed position, the interior inwardly facing inward surfaces of the flip and base abut and face each other so as to be hidden from view in the interior of the electronic device and are not accessible to the user. In the closed position in the tablet mode, the exterior outer surfaces of the flip and base are visible and accessible to the user.

Figure 3:
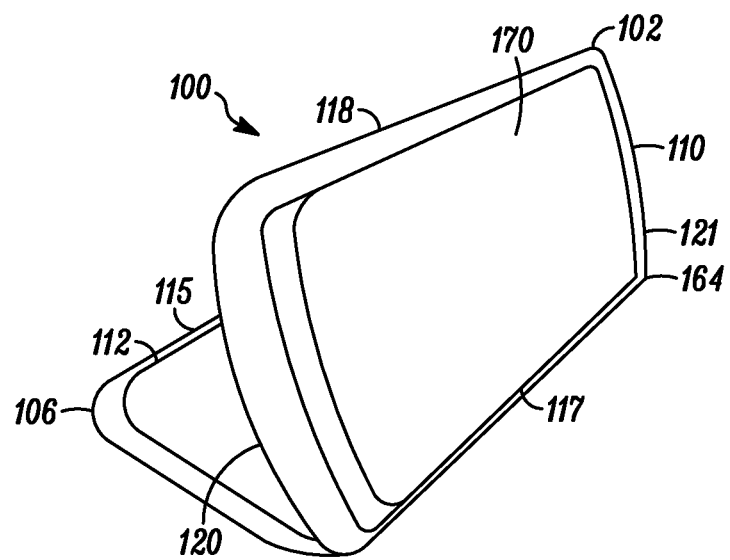
FIG. 3 is a perspective view of the mobile electronic device shown in a partially open position in a media viewing mode.
Figure 4:
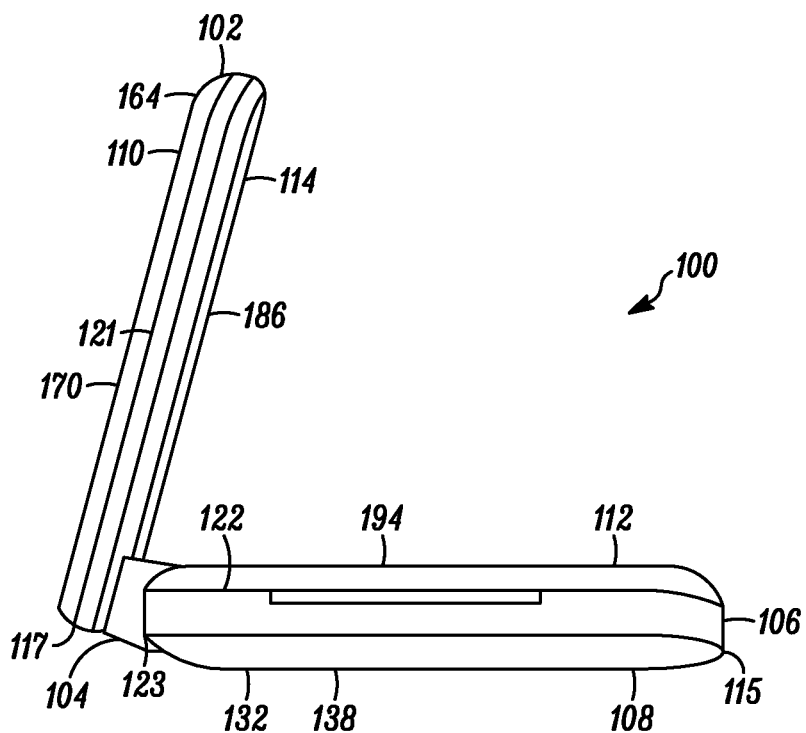
FIG. 4 is a side view of the mobile electronic device shown in the partially open position in the media viewing mode.

In the media viewing mode as shown in FIGS. 3 and 4, the user sets of the desired angle of the flip and the flip is then held open with a holding torque produced by the friction between the asymmetrical cam and the follower. In the partially open, media viewing mode, the user sets the desired angle of the flip to access the inward surfaces of the flip and base.

In the fully open position as shown in FIGS. 5 and 6, the flip is held open about 190 degrees using the second detent in the asymmetrical cam. In the fully open position, the user can readily and fully access the touchpad, keypad, battery door and touchscreen display.

The mobile electronic device can have a touchpad or touch-detecting surface on the rear of a flip or slide device for use as input mechanism. This provides a natural location of pointer fingers when holding the base of the mobile electronic device, so that the user does not need to block the display comprising a touchscreen to navigate and select items on the touchscreen, nor does the user need navigation keys on the keypad in the base.

The touchpad or touch-detecting surface can detect when the other half of the mobile electronic device is near it by detecting change in capacitance from the metal housing. This reduces cost of flip/slide detection because the touch surface is used for this additional function. The mobile electronic device is more reliable as it does not rely on a magnetic switch.

The mobile electronic device can have a touchpad sensor integrated into the printed circuit board (PCB) of the flip or slide, which can also be used for other functions such as an earpiece speaker and/or a display connection. Advantageously, the touch surface can be implemented without adding the cost of a standalone sensor. The size of the mobile electronic device is not increased because the PCB thickness is already present for other electrical functions.

This mobile electronic device can utilize the rear surface of the flip portion of the mobile electronic device for user interface (UI) navigation. When the mobile electronic device is fully opened, a capacitive or resistive touchpad is positioned on the inward surface of the flip or slide directly behind the display in the outward surface of the flip or slider portion of the mobile electronic device. When the touchpad is touched by the user, the motion of the finger translates to motion within the UI on the forward facing display. This can include highlighting different web links or scrolling through text. It can also include implementing a mouse cursor on the UI which follows the motion of a user's finger on the back of the mobile electronic device.

The capacitive/resistive touch, cursor functionality, and blind navigation techniques in this form for the mobile electronic device is unique and offer many advantages.

The X/Y touchpad on the inward surface or rear of the flip prevents the user from having to block the display screen on the outward surface of the flip when navigating as they would when using the touchscreen. The position in the flip prevents unintentional actuation since the user will hold the base and the touchpad is hidden when the flip or slider is closed. Furthermore, the use of this location for a touchpad for a navigation solution eliminates the need for a navigation device on the main keypad which opens space on the keypad for additional functional keys or reducing the X/Y size needed for the keypad.

Moreover, by placing a printed circuit board (PCB) in the flip assembly, a pattern of copper traces or wires can be laid out to detect a user's finger gestures without enlarging or adversely impacting the size of the mobile electronic device. This allows for an additional input and functions with no additional cost for a sensor or size increases.

A unique mobile electronic device is provided with a novel form factor in which capacitive/resistive touch, cursor functionality, and blind navigation techniques are implemented and offer specific advantages. The X/Y touchpad on the rear of the flip prevents the user from having to block the touchscreen display when navigating as they would when using the touchscreen. The position in the flip prevents unintentional actuation since the user will hold the base and the touchpad is hidden when the flip is closed. Also, the use of this location for a navigation solution eliminates the need for a navigation device on the main keypad and provides space for additional functional keys or reducing the X/Y size needed for the main keypad.

The additional use of the touchpad for a flip detect mechanism, is unique and advantageous compared to the mechanical switches or hall-effect-based magnetic switches used in conventional hinged products. This re-use of the navigation pad can be less expensive compared to a magnetic switch implementation.

The mobile electronic device utilizes the rear surface of the flip portion of the mobile electronic device for user interface navigation. When the mobile electronic device is fully opened a capacitive or resistive touchpad can be positioned behind the display in the flip portion of the mobile electronic device. When the pad is touched by the user, the motion of the finger translates to motion within the user interface (UI) on the forward facing display. This can include highlighting different web links or scrolling through text. It can also include implementing a mouse cursor on the UI which follows the motion of a user's fingers on the back of the mobile electronic device.

Among the many advantages of the mobile electronic device are:
1. Superior capability.
2. Superb performance.
3. Enhanced zoom functionality.
4. Excellent navigation, scrolling, zooming and magnification.
5. Better detection of finger gestures.
6. Reliable.
7. Comfortable.
8. Light weight.
9. Portable.
10. User friendly.
11. Easy to use.
12. Durable
13. Economical.
14. Attractive.
15. Efficient.
16. Effective.

Although embodiments of the invention have been shown and described, it is to be understood that various modifications, substitutions, and rearrangements of parts, components, and/or process (method) steps, as well as other uses of the mobile electronic device can be made by those skilled in the art without departing from the novel spirit and scope of this invention.

What is claimed is:

1. A mobile electronic device, comprising:
a cellular phone comprising
a base providing a compartment defining a cavity for containing a battery;
a movable portion operatively connected to the base, said movable portion being selected from the group consisting of a flip and a slide, said movable portion being movable from a fully open position in a text-entry mode to a closed position in a tablet mode and vice versa;
said base and said movable portion each having an outward surface and an inward surface;
a keypad on the outward surface of said base;
a battery door on the inward surface of said base;
a display assembly comprising a user interface and a touchscreen display on the outward surface of said movable portion;
a touchpad comprising a navigation control on the inward surface of said movable portion for navigating said touchscreen display, and said touchpad being positioned for use without blocking view of said touchscreen display;
said touchscreen display on the outward surface of said movable portion and said keypad on the outward surface of said base face outwardly and away from each other in the closed position in the tablet mode and are visible and accessible to a user in the closed position in the tablet mode;
said touchpad on the inward surface of said moveable portion and said battery door on the inward surface of said base face inwardly and towards each other in the closed position in the tablet mode and are inaccessible to the user in the closed position in the tablet mode; and
said touchpad, keypad, battery door and touchscreen display are accessible to the user in the fully open position in the text-entry mode.

2. The mobile electronic device in accordance with claim 1 wherein said touchpad comprises a zoom control for zooming, increasing or decreasing the size of text or other graphics on said touchscreen display.

3. The mobile electronic device in accordance with claim 1 wherein said touchpad comprises a magnifier for magnifying a portion of said touchscreen display.

4. The mobile electronic device in accordance with claim 1 wherein said cellular phone is selected from the group of consisting of a flip phone, portable networking device, interne communications device, clamshell device, radio telephone, mobile phone, smart phone, personal digital assistant, wireless e-mail device, two-way pager, handheld electronic communications device, and combinations of any of the preceding.

5. The mobile electronic device in accordance with claim 1 wherein
said touchpad comprises a zoomable touchpad for zooming in and out of an area of said touchscreen display touched by the user in response to touching said touchpad.

6. The mobile electronic device in accordance with claim 1 wherein said touchpad comprises a changeable touchpad for changing from a navigation mode to a zoom control in a zoom mode in response to an event from the group consisting of pressing a shift key, pressing a command button, changing the orientation of the device, launching an application, and touching the touchscreen or touchpad with a specific gesture.

7. The mobile electronic device in accordance with claim 1 wherein said touchpad comprises a transforming touchpad for transforming to a zoom control when said touchpad is touched and held by the user and returning to the navigation control when said touchpad is released by the user.

8. The mobile electronic device in accordance with claim 1 wherein said touchpad comprises a capacitive touchpad for activating a window on said touchscreen display to electronically display applications selected from the group consisting of applications which are downloaded, frequently used, idle, active, and available in the mobile electronic device when the user touches said capacitive touchpad, and said capacitive touchpad can be used by the user to scroll and select one or more of the applications.

9. The mobile electronic device in accordance with claim 1 wherein:
said user interface comprises tabbed windows providing tabs;
said touchpad comprises a touchpad scroll control for scrolling through said tabbed windows in response to moving a finger of the user along said touchpad; and
said touchscreen display displays a page and comprises a scroll control for scrolling within the active page within the user interface to interact with the page while the touchpad is being scrolled to move between tabs.

10. The mobile electronic device in accordance with claim 1 wherein
said touchpad comprises a visual selector for viewing or cycling through media selected from the group consisting of songs, albums, contacts, e-mail, art, movies, videos, photographs, books, newspapers, magazines, and titles of the preceding.

11. A mobile electronic device, comprising:
a cellular phone comprising a base defining a compartment for containing a battery;

a flip pivotably connected to said base by a hinge, said flip being pivotable from a closed position in a tablet mode, to a partially open position in a media viewing mode and to a fully open position in a text-entry mode and vice versa;

said base and said flip each having an outward surface and an inward surface;

a keypad on the outward surface of said base, said keypad being selected from the group consisting of a qwerty keypad, capacitive keypad, keyboard, alpha numeric keys, and a base touchscreen, and said keypad facing downwardly when the flip is in the partially open position in the media viewing mode;

a battery door on the inward surface of said base;

a display assembly comprising a user interface with a touchscreen display on the outer surface of said flip, said touchscreen display being positioned opposite the keypad when said flip is in a closed position in the tablet mode, said touchscreen display facing upwardly with and in proximity to said keypad when the flip is in a fully open position in the text-entry mode, and said touchscreen display being positioned at an angle of inclination when said flip is in a partially open position in the media viewing mode;

a touchpad on the inward surface of said flip and positioned transversely opposite of said touchscreen display, said touchpad being substantially hidden and inaccessible when said flip is in the closed position in the tablet mode, said touchpad comprising a navigation control on the inward surface of said flip for navigating said touchscreen display, and said touchpad being positioned for use by a user without blocking view of said touchscreen display;

said touchscreen display on the outward surface of said flip and said keypad on the outward surface of said base facing outwardly and away from each other in the closed position in the tablet mode and are visible and accessible to a user in the closed position in the tablet mode;

said touchpad on the inward surface of said flip and said battery door on the inward surface of said base facing inwardly and towards each other in the closed position in the tablet mode and are inaccessible to the user in the closed position in the tablet mode;

said touchpad on the inward surface of said flip, said battery door on the inward surface of said base face, and said touchscreen display on the outward surface of said flip are visible and accessible to the user in the partially open position in the media viewing mode; and said touchpad, keypad, battery door and touchscreen display are accessible to the user in the fully open position in the text-entry mode.

12. The mobile electronic device in accordance with claim 11 wherein said touchpad is selected from the group consisting of:

a touchpad with a zoom control for zooming, increasing or decreasing the size of text or graphics on said display;

a touchpad with a magnifier for magnifying a portion of said display;

a capacitive zoomable touchpad for zooming in and out of an area of said touchscreen display touched by the user in response to touching the touchpad;

a changeable touchpad for changing from the navigation control in a navigation mode to a zoom control in a zoom mode in response to an event from the group consisting of pressing a shift key, pressing a command button, changing the orientation of the device, launching an application, and touching the touchscreen display or touchpad with a specific gesture;

a transforming touchpad for transforming to a zoom control when said touchpad is touched and held by the user and returning to the navigation control when said touchpad is released by the user; and a capacitive touchpad for activating a window on said display to electronically display applications selected from the group consisting of applications which are downloaded, frequently used, idle, active, and available in said cellular phone when the user touches the touchpad, and the touchpad can be used by the user to scroll and select one or more of the applications.

13. The mobile electronic device in accordance with claim 11 wherein:

said user interface comprises tabbed windows providing tabs;

said touchpad comprises a touchpad scroll control for scrolling through said tabbed windows in response to moving a finger of the user along said touchpad; and said touchscreen display displays a page and comprises a scroll control for scrolling within the active page within the user interface to interact with the page while the touchpad is being scrolled to move between tabs.

14. The mobile electronic device in accordance with claim 11 wherein said touchpad comprises a visual selector for viewing or cycling through media selected from the group consisting of songs, albums, contacts, e-mail, art, movies, videos, photographs, books, newspapers, magazines, and titles of the preceding.

15. The mobile electronic device in accordance with claim 11 wherein:

said cellular phone is selected from the group of consisting of a flip phone, portable networking device, internet communications device, clamshell device, radio telephone, mobile phone, smart phone, portable gaming device, personal digital assistant, wireless e-mail device, two-way pager, handheld electronic communications device, and combinations thereof; and said cellular phone is of a compact size for readily fitting in a shirt pocket, pants pocket, suit pocket, and/or purse.

16. A method of using a mobile electronic device, comprising the steps of:

providing a mobile electronic device comprising a cellular phone, said cellular phone having a flip pivotably connected to a base, a keypad on an outward surface of said base and a battery door on an inward surface of said base, a touchscreen display on an outward surface of said flip, and a capacitive touchpad on an inward surface of said flip;

navigating said touchscreen display by sliding a finger along or touching said capactive touchpad; while simultaneously allowing full view of said touchscreen display and substantially preventing blocking of the view of said touchscreen display;

moving said flip from a closed position in a tablet mode, to a partially open position in a media viewing mode and to a fully open position in a text-entry mode and vice versa;

said touchscreen display on the outward surface of said flip and said keypad on the outward surface of said base facing outwardly and away from each other in the closed position in the tablet mode and are visible and accessible to a user in the closed position in the tablet mode;

said capacitive touchpad on the inward surface of said flip and said battery door on the inward surface of said base facing inwardly and towards each other in the closed position in the tablet mode and are inaccessible to the user in the closed position in the tablet mode;

said capacitive touchpad on the inward surface of said flip, said battery door on the inward surface of said base face, and said touchscreen display on the outward surface of said flip are visible and accessible to the user in the partially open position in the media viewing mode; and said capacitive touchpad, keypad, battery door and touchscreen display are accessible to the user in the fully open position in the text-entry mode.

17. The method of using a mobile electronic device in accordance with claim 16 including zooming in and out of a portion of the display by touching, contacting, or engaging said capacitive touchpad.

18. The method of using a mobile electronic device in accordance with claim 16 including magnifying a portion of the touchscreen display by pressing, tapping or clicking said capacitive touchpad.

19. The method of using a mobile electronic device in accordance with claim 16 including changing or transforming the mode of said capacitive touchpad from a navigation mode to a zoom mode and vice versa.

20. The method of using a mobile electronic device in accordance with claim 16 including;
   scrolling said capacitive touchpad; and/or
   scrolling the touchscreen display.

* * * * *